(12) United States Patent
Kambe

(10) Patent No.: US 6,778,313 B2
(45) Date of Patent: Aug. 17, 2004

(54) OPTICAL PHASE MODULATOR AND OPTICAL EQUALIZER USING THE SAME

(75) Inventor: Toshiyuki Kambe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/259,446

(22) Filed: Sep. 30, 2002

(65) Prior Publication Data

US 2003/0063364 A1 Apr. 3, 2003

(30) Foreign Application Priority Data

Oct. 3, 2001 (JP) .......................... 2001/308094

(51) Int. Cl.[7] .................... G02F 1/01; G02F 1/035
(52) U.S. Cl. ................. 359/279; 359/245; 359/322; 385/3; 385/132
(58) Field of Search ............... 359/279, 245, 359/246, 251, 315, 322; 385/3, 132

(56) References Cited

U.S. PATENT DOCUMENTS 4,932,737 A * 6/1990 Yoon et al. ............... 385/3
5,383,048 A * 1/1995 Seaver .................. 359/279
5,751,867 A * 5/1998 Schaffner et al. .......... 385/3

FOREIGN PATENT DOCUMENTS

| JP | 62-36631  | 2/1987 |
| JP | 64-77002  | 3/1989 |
| JP | 5-93891   | 4/1993 |
| JP | 6-67129   | 3/1994 |
| JP | 6-46245   | 6/1994 |
| JP | 7-28006   | 1/1995 |
| JP | 7-199035  | 8/1995 |

* cited by examiner

*Primary Examiner*—Georgia Epps
*Assistant Examiner*—M. Hasan
(74) *Attorney, Agent, or Firm*—McGinn & Gibb, PLLC

(57) ABSTRACT

In an optical phase modulator, a substrate has electro-optical effect. An optical waveguide is formed in a surface portion of the substrate. A phase modulation section is provided on an input side to change a refractive index of the optical waveguide for phase modulation to input light. An adjustment section is provided on an output side to change a refractive index of the optical waveguide for elimination of polarization dependency of the phase-modulated light. In this case, the refractive index change rate in the phase modulation section and the refractive index change rate in the adjustment section may have different signs each other.

28 Claims, 9 Drawing Sheets

| SUBSTRATE ORIENTATION | LIGHT PROPAGATION DIRECTION | ADJUSTMENT ELECTRIC FIELD | TE MODE REFRACTIVE INDEX CHANGE | TM MODE REFRACTIVE INDEX CHANGE | MODE CONVERSION |
|---|---|---|---|---|---|
| Xcut | Y | Ex | 0 | 0 | PRESENT |
|  |  | Ey | 0 | $-0.5n_x^2 r_{22} E_y$ | — |
|  |  | Ez | $+0.5n_z^2 r_{33} E_z$ | $+0.5n_x^2 r_{33} E_z$ | — |
|  | Z | Ex | 0 | 0 | PRESENT |
|  |  | Ey | $0.5n_x^2 r_{22} E_y$ | $-0.5n_y^2 r_{22} E_y$ | — |
|  |  | Ez | $+0.5n_x^2 r_{13} E_z$ | $+0.5n_y^2 r_{13} E_z$ | — |
| Ycut | X | Ex | 0 | 0 | PRESENT |
|  |  | Ey | 0 | $+0.5n_y^2 r_{22} E_y$ | — |
|  |  | Ez | $+0.5n_z^2 r_{33} E_z$ | $+0.5n_y^2 r_{13} E_z$ | — |
|  | Z | Ex | $-0.5n_y^2 r_{22} E_y$ | $+0.5n_y^2 r_{22} E_y$ | PRESENT |
|  |  | Ey | $+0.5n_y^2 r_{13} E_z$ | $+0.5n_y^2 r_{13} E_z$ | — |
|  |  | Ez |  |  | PRESENT |
| Zcut | X | Ex | 0 | 0 | 0 |
|  |  | Ey | $-0.5n_y^2 r_{22} E_y$ | 0 | PRESENT |
|  |  | Ez | $+0.5n_y^2 r_{33} E_z$ | $+0.5n_z^2 r_{33} E_z$ | — |
|  | Y | Ex | $-0.5n_x^2 r_{22} E_y$ | 0 | PRESENT |
|  |  | Ey | $+0.5n_x^2 r_{13} E_z$ | $+0.5n_z^2 r_{33} E_z$ | — |

Fig. 5

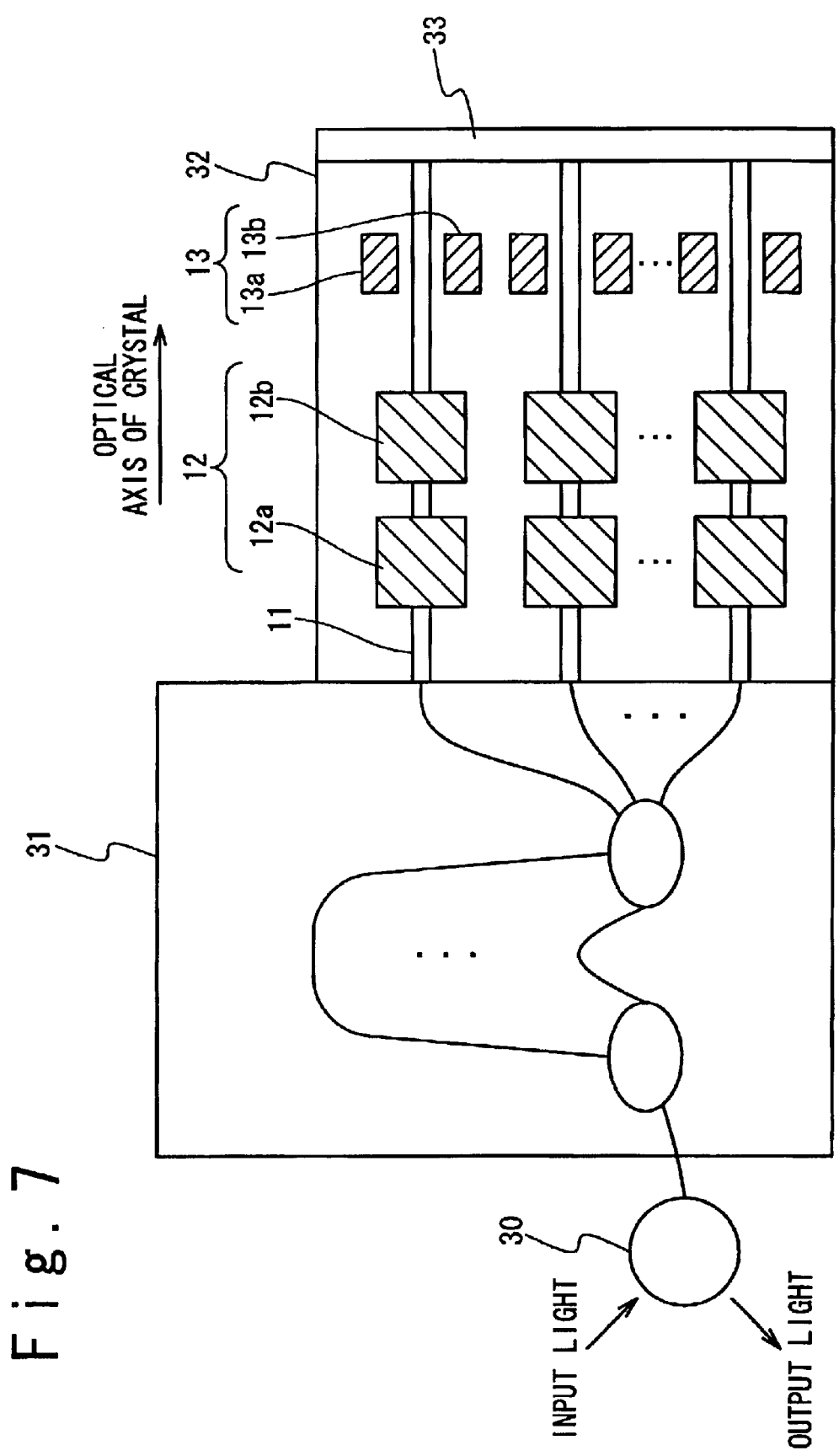

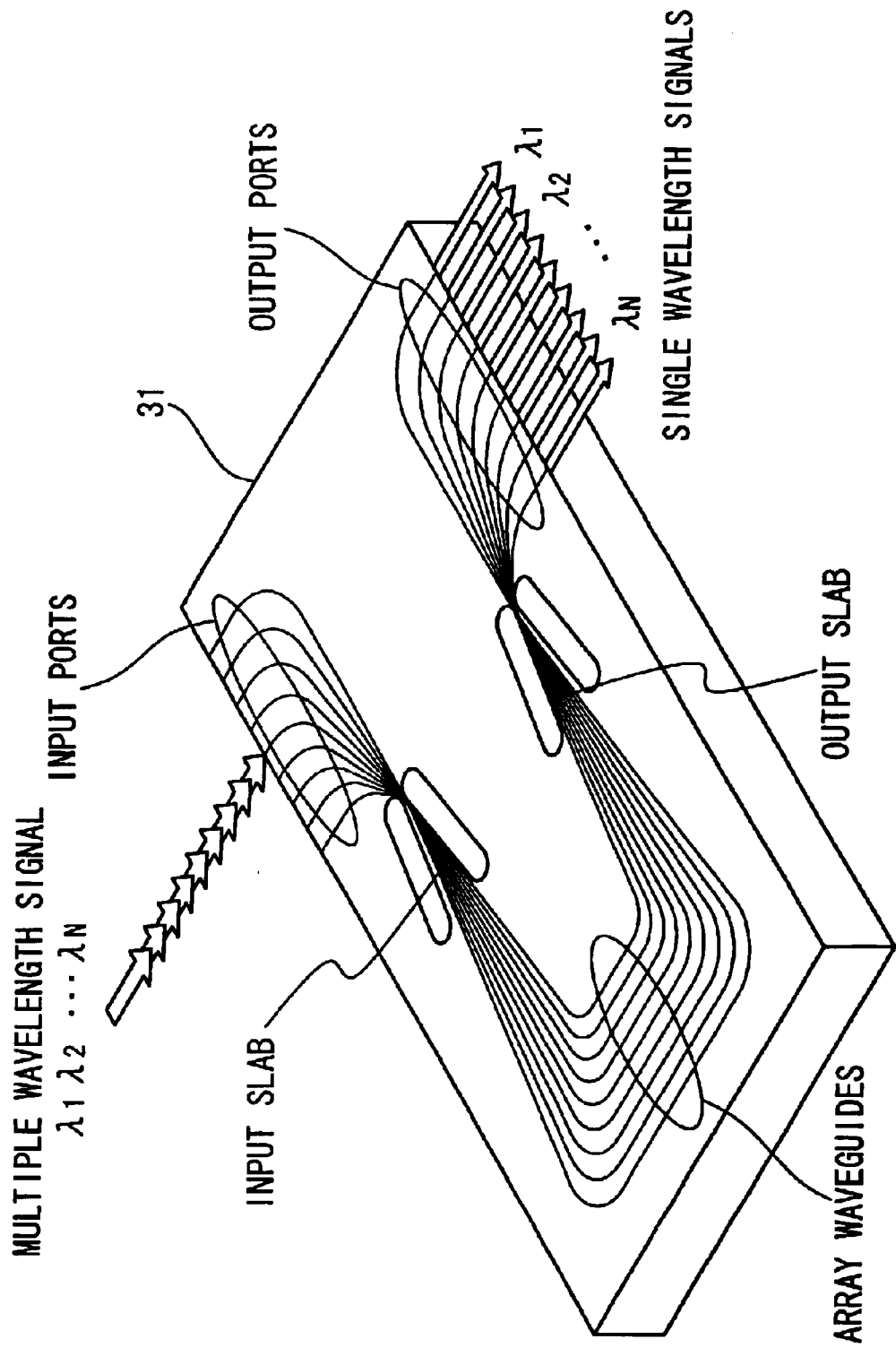

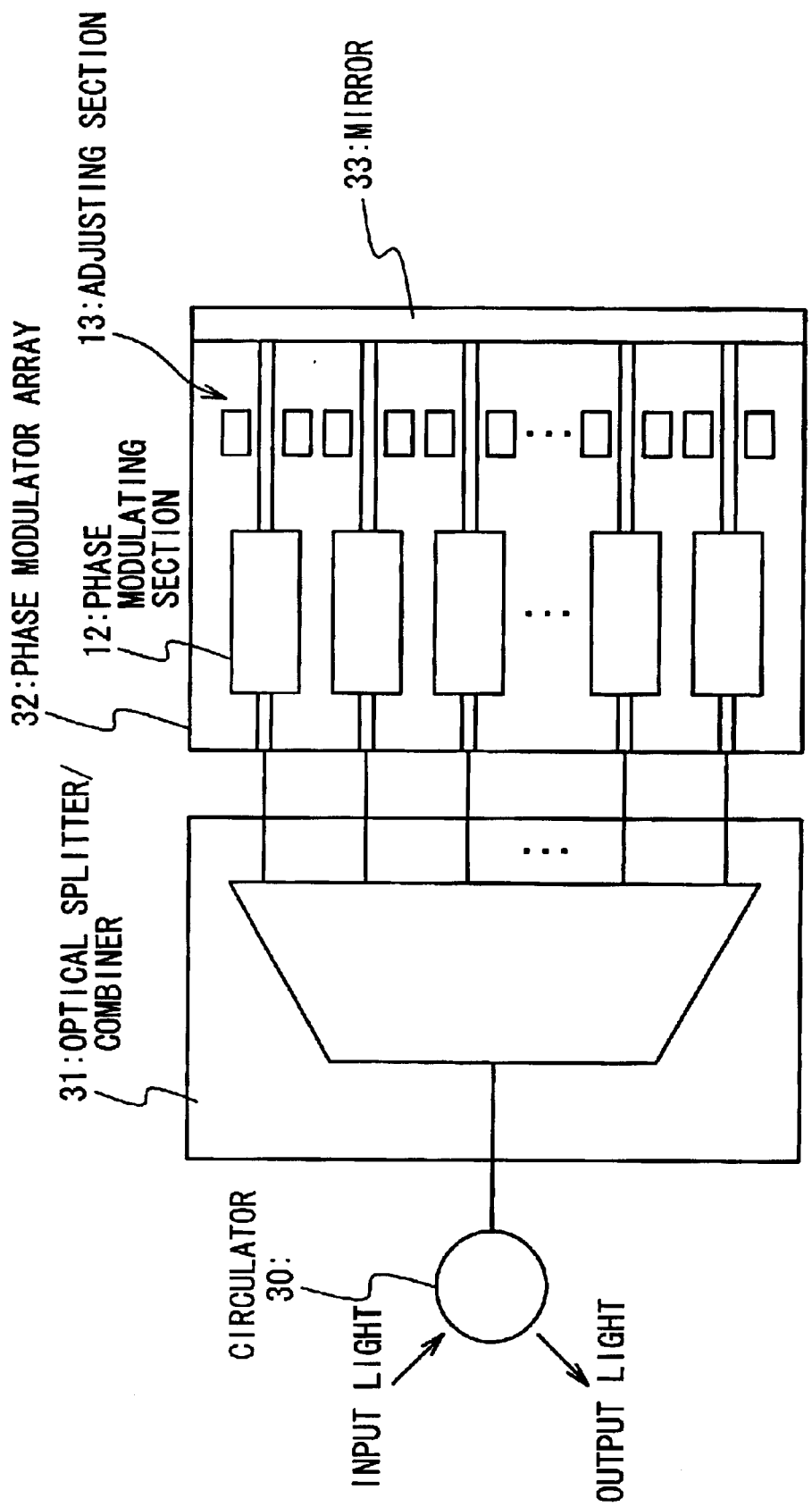

OPTICAL PHASE MODULATOR AND OPTICAL EQUALIZER USING THE SAME

BACKGROUND OF THE INVENTION

1. Field of the Invention

The present invention relates to an optical control device such as an optical phase modulator and an optical equalizer using the same. More particularly, the present invention relates to a technique for preventing occurrence of polarization dependency in an optical control device of an optical waveguide type.

2. Description of the Related Art

Conventionally, an optical phase modulator is known as one of optical control devices to perform a phase modulation on light propagated through an optical waveguide.

As shown in FIG. 1, the phase modulator is composed of an optical waveguide 11 formed on a substrate 10 made of lithium niobate and a phase modulator 12 of a phase modulation electrode 12a and a phase modulation electrode 12b which are provided on the optical waveguide 11. In the phase modulator, an electric field is generated by applying a voltage between the phase modulation electrodes 12a and 12b and is applied to the optical waveguide 11. The refractive index of the substrate is varied by electro-optical effect in a portion of the optical waveguide 11 to which the electric field is applied. Thus, the phase of the light propagated through the optical waveguide 11 is modulated.

By the way, in such a conventional phase modulator, a distribution of refractive indexes in the optical waveguide is asymmetrical, and a distribution of stresses is asymmetrical due to the warp of the substrate and the change in the refractive index due to stress change in the vicinity of the optical waveguide. For these reasons, the polarization dependency is caused.

As a technique for preventing the polarization dependency, for example, a technique disclosed in Japanese Laid Open Patent Application (JP-A-Showa 62-36631: reference 1) is known. In this technique, for the prevention of the polarization dependency, a waveguide type optical modulator uses a polarization separating device (PBS) to separate incident light into a TE mode light and a TM mode light. Then, after the TE mode light and the TM mode light are individually subjected to phase modulation, the phase-modulated lights are combined using the polarization separating device.

Also, Japanese Laid Open Patent Application (JP-A-Heisei 7-199035: reference 2) discloses an optical waveguide type polarization scrambler. For the prevention of the polarization dependency at a time of a scrambling operation, the optical waveguide type polarization scrambler is composed of a phase modulator provided in a straight portion of an optical waveguide formed on a dielectric crystal substrate, and a quarter wavelength plate provided behind the phase modulator.

However, the prevention of the polarization dependency is insufficient in the reference 1 and the reference 2.

In conjunction with the above description, an optical integrated circuit is disclosed in Japanese Laid Open Patent Application (JP-A-Showa 64-77002). In this reference, the optical integrated circuit is composed of a substrate, a single mode optical waveguide, and a stress applying film. The single mode optical waveguide is embedded in a clad layer arranged on the substrate and has a core portion with a light propagation function. The stress applying film is arranged on a predetermined portion of the clad layer and irreversibly changes the stress acting to the core portion by trimming to adjust a stress birefringence.

Also, a waveguide type optical modulator is disclosed in Japanese Laid Open Patent Application (JP-A-Heisei 5-93891). In this reference, the optical modulator is composed of a crystal substrate with electro-optical effect, an input optical waveguide, two phase shift optical waveguides, an output optical waveguide, modulation electrodes and at lease a pair of bias control electrodes. The two phase shift optical waveguides are obtained by dividing the input optical waveguide, and are connected to the output optical waveguide as one body. The modulation electrodes are arranged in the neighborhood of the two phase shift optical waveguides. The pair of bias control electrodes is arranged in the neighborhood of the two phase shift optical waveguides.

Also, a single mode optical waveguide with a stress release groove is disclosed in Japanese Examined Patent Application (JP-B2-Heisei 6-46245). In this reference, the optical integrated circuit is composed of a substrate, a single mode optical waveguide, and a stress release groove. The single mode optical waveguide is composed of a clad layer and a core section. The clad layer has a thermal expansion coefficient different from that of the substrate. The core section is formed in the clad layer, and provides stress birefringence due to the difference in thermal expansion coefficient between the substrate and the clad layer. The stress release groove is provided locally along the extending direction of the core section on the clad layer surface in the neighborhood of the core section to release the stress and to adjust the stress birefringence.

Also, an optical wavelength filter is disclosed in Japanese Laid Open Patent Application (JP-A-Heisei 6-67129). In this reference, an optical wavelength filter is composed of a Mach-Zehnder interferometer with first and second waveguides, which are provided on a substrate with electro-optical effect. A ratio of a refractive index change for first polarized light to a refractive index change for second polarized light, in which the refractive index changes are caused the electro-optical effect in the first waveguide, is same as a ratio of a light path length for the first polarized light to a light path length for the second polarized light between the first and second waveguides.

Also, an optical bias adjusting method is disclosed in Japanese Laid Open Patent Application (JP-A-Heisei 7-28006). In this reference, an optical waveguide is formed on an optical crystal substrate with electro-optical effect. The optical waveguide has a refractive index larger than that of the substrate. A light transmissive film is formed on a part or parts of the optical waveguide by a deposition method or a sputtering method. By changing the refractive index due to the warp in the part or parts of the optical waveguide, the phase of light propagated through the optical waveguide is changed.

SUMMARY OF THE INVENTION

Therefore, an object of the present invention is to provide an optical phase modulator which can carry out phase modulation to a light signal while preventing polarization dependency.

Therefore, an object of the present invention is to provide an optical equalizer using the above phase modulator.

In an aspect of the present invention, an optical phase modulator includes a substrate having electro-optical effect. An optical waveguide is formed in a surface portion of the substrate. A phase modulation section is provided on the optical waveguide at least on an input side to carry out phase modulation to input light. An adjustment section is provided on an output side to eliminate polarization dependency of the phase-modulated light.

The phase modulation section may include a first phase modulation electrode provided on the input side, and a second phase modulation electrode provided on the output side. The phase modulation is carried out to the light by first electric field which is generated by applying a first voltage between the first and second phase modulation electrodes.

Also, the adjustment section may include adjustment electrodes provided on either side of the optical waveguide along the optical waveguide. The polarization dependency is eliminated by a second field which is generated by applying a second voltage between the adjustment electrodes.

Also, the phase modulation section may carry out the phase modulation to the light by changing a refractive index of the optical waveguide in response to a first voltage. The adjustment section may carry out the elimination of the polarization dependency of the phase-modulated light by changing a refractive index of the optical waveguide in response to a second voltage. In this case, a refractive index change rate in the phase modulation section and a refractive index change rate in the adjustment section may have different signs each other.

Also, the substrate may be formed of lithium niobate ($LiNbO_3$) and cut out to have a plane orthogonal to an X-axis, and the optical waveguide may be formed in the surface portion of the substrate having the plane orthogonal to the X-axis and extends in a Z-axis direction.

In another aspect of the present invention, an optical phase modulator includes a substrate having electro-optical effect. An optical waveguide is formed in a surface portion of the substrate. A phase modulation section is provided on the substrate along the optical waveguide on an input side to carry out phase modulation to input light. An adjustment section is provided on an output side to eliminate polarization dependency of the phase-modulated light.

Also, the phase modulation section may include a first set of phase modulation electrodes provided on the substrate along the optical waveguide on one side of the optical waveguide, and a second set of phase modulation electrodes provided on the substrate along the optical waveguide. The phase modulation section may carry out the phase modulation to the light by first electric field which is generated by applying a first voltage between the phase modulation electrodes of the first set and second electric field which is generated by applying a second voltage between the phase modulation electrodes of the second set.

Also, the adjustment section may include adjustment electrodes provided on either side of the optical waveguide along the optical waveguide. The polarization dependency is eliminated by third electric field which is generated by applying a third voltage between the adjustment electrodes.

Also, the phase modulation section may carry out the phase modulation to the light by changing a refractive index of the optical waveguide in response to first and second voltages. The adjustment section may carry out the elimination of the polarization dependency of the phase-modulated light by changing a refractive index of the optical waveguide in response to a third voltage.

Also, a refractive index change rate in the phase modulation section and a refractive index change rate in the adjustment section have different signs each other.

Also, the substrate may be formed of lithium niobate ($LiNbO_3$) and cut out to have a plane orthogonal to an X-axis. The optical waveguide maybe formed in the surface portion of the substrate having the plane orthogonal to the X-axis and extends in a Z-axis direction.

In another aspect of the present invention, an optical phase modulator includes a substrate having electro-optical effect. An optical waveguide is formed in a surface portion of the substrate. A phase modulation section is provided on an input side to change a refractive index of the optical waveguide for phase modulation to input light. An adjustment section is provided on an output side to change a refractive index of the optical waveguide for elimination of polarization dependency of the phase-modulated light. In this case, the refractive index change rate in the phase modulation section and the refractive index change rate in the adjustment section may have different signs each other.

In another aspect of the present invention, an optical phase modulator includes a substrate having electro-optical effect. Each of A plurality of phase modulation units are formed on the substrate includes an optical waveguide formed in a surface portion of the substrate. A phase modulation section is provided on an input side to change a refractive index of the optical waveguide for phase modulation to input light. An adjustment section is provided on an output side to change a refractive index of the optical waveguide for elimination of polarization dependency of the phase-modulated light.

Also, the refractive index change rate in the phase modulation section and the refractive index change rate in the adjustment section may have different signs each other.

In another aspect of the present invention, an optical equalizer includes a circulator which receives multiple wavelength light and outputs phase-modulated multiple wavelength light. An optical splitting and combining unit separates the multiple wavelength light supplied from the circulator into a plurality of single wavelength lights, and combines a plurality of single wavelength reflected lights into the phase-modulated multiple wavelength light to output to the circulator. A phase modulator carries out phase modulation to the plurality of single wavelength lights without polarization dependency to produce a plurality of single wavelength phase-modulated lights, and feeds back the plurality of single wavelength phase-modulated lights to the optical splitting and combining unit as the plurality of single wavelength reflected lights.

Here, the phase modulator may include a substrate having electro-optical effect, a plurality of phase modulation units and a mirror. The plurality of phase modulation units are formed on the substrate to carry out the phase modulation to the plurality of single wavelength lights without polarization dependency, and to pass the plurality of single wavelength phase-modulated lights. A mirror is provided to reflect the plurality of single wavelength phase-modulated lights such that the plurality of single wavelength phase-modulated lights pass through the plurality of phase modulation units and are supplied to the optical splitting and combining unit as the plurality of single wavelength reflected lights.

Also, each of the plurality of phase modulation units may include an optical waveguide formed in a surface portion of the substrate. A phase modulation section is provided on an input side to change a refractive index of the optical waveguide for phase modulation to input light. An adjustment section is provided on an output side to change a refractive index of the optical waveguide for elimination of polarization dependency of the phase-modulated light.

Also, the refractive index change rate in the phase modulation section and the refractive index change rate in the adjustment section may have different signs each other.

Also, the phase modulation section may include a first phase modulation electrode provided on the input side, and a second phase modulation electrode provided on the output side. The phase modulation is carried out to the light by first electric field which is generated by applying a first voltage between the first and second phase modulation electrodes.

Also, the phase modulation section may include a first set of phase modulation electrodes provided on the substrate along the optical waveguide on one side of the optical waveguide, and a second set of phase modulation electrodes provided on the substrate along the optical waveguide on the other side of the optical waveguide. The phase modulation section may carry out the phase modulation to the light by first electric field which is generated by applying a first voltage between the phase modulation electrodes of the first set and second electric field which is generated by applying a second voltage between the phase modulation electrodes of the second set.

Also, the adjustment section may include adjustment electrodes provided on either side of the optical waveguide along the optical waveguide. The polarization dependency is eliminated by third electric field which is generated by applying a third voltage between the adjustment electrodes.

BRIEF DESCRIPTION OF THE DRAWINGS

FIG. 5 is a table showing a change in a refractive index of a TE mode and a TM mode for the orientation of a substrate in the optical phase modulator according to the first embodiment of the present invention;

FIG. 7 is a plan view showing an equalizer according to the present invention using the optical phase modulator;

FIG. 8 is a perspective view showing a optical splitting and combining unit used in the equalizer of the present invention; and FIG. 9 is a block diagram showing a function of the equalizer according to the present invention.

DESCRIPTION OF THE PREFERRED EMBODIMENTS

An optical phase modulator and an equalizer using the same according to the present invention will be described below in detail with reference to the attached drawings.

Figure 1:
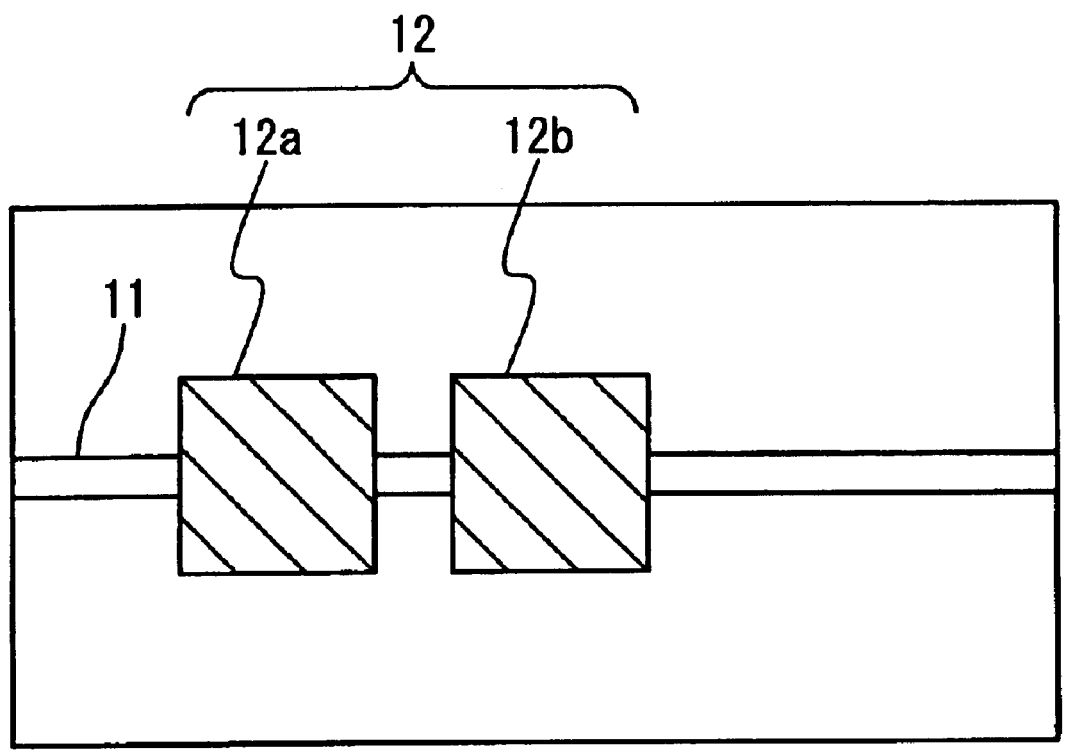
FIG. 1 is a diagram showing a conventional phase modulator.
Figure 2:
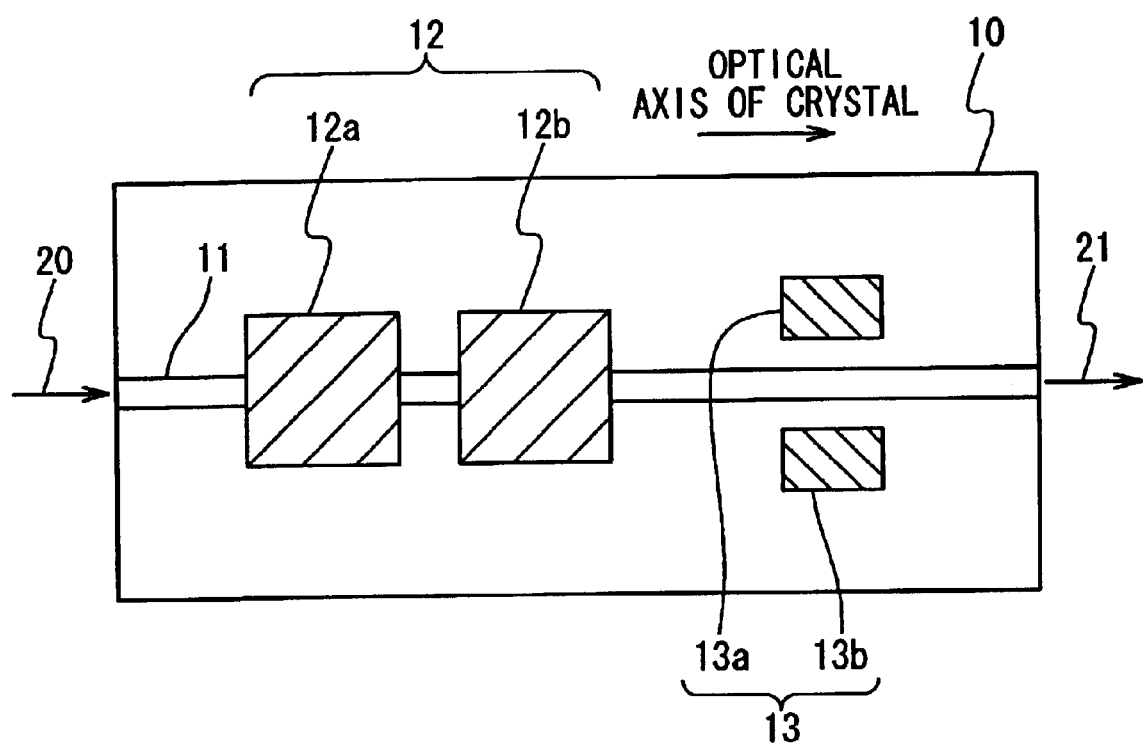
FIG. 2 is a plan view showing the structure of an optical phase modulator according to a first embodiment of the present invention.
Figure 3:
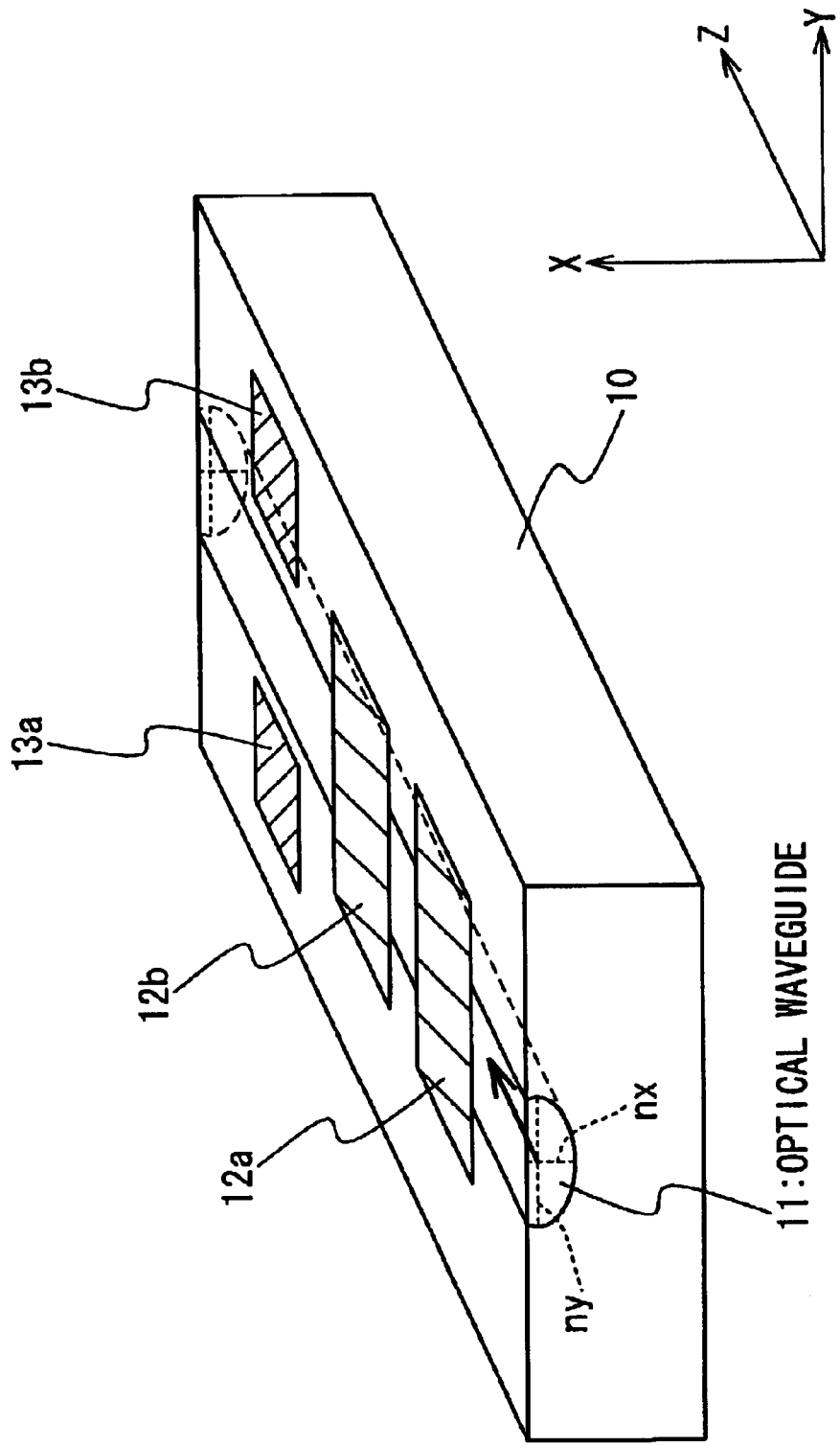
FIG. 3 is a perspective view showing the structure of the optical phase modulator according to the first embodiment of the present invention.

FIG. 2 is a plan view showing the structure of the optical phase modulator according to the first embodiment of the present invention. FIG. 3 is a perspective view showing the structure the optical phase modulator according to the first embodiment of the present invention. Referring to FIGS. 2 and 3, the phase modulator is composed of an optical waveguide 11 formed on a substrate 10, a phase modulator section 12 composed of phase modulation electrodes 12a and 12b, and an adjustment section 13 composed of adjusting electrodes 13a and 13b.

The substrate 10 is formed of lithium niobate (LiNbO$_3$: LN) and cut out in a direction orthogonal to the X-axis (X-cut). Light is propagated in a Z-axis direction (Z-axis propagation), as shown in FIG. 2. The optical waveguide 11 is formed in the surface portion of the substrate 10 having an X-cut plane (YZ-plane).

In the first embodiment, the lithium niobate is used as an example of a material of the substrate 10. However, the material of the substrate 10 is not limited to lithium niobate. In the present invention, it is possible to use a material of a one-axis crystal having a crystal system such as a trigonal system and a hexagonal system and having electro-optical effect or a material in which a point group of a crystal is $C_{3v}$, $C_3$, $D_3$, $C_{3h}$ and $D_{3h}$. These materials have a refractive index adjusting function in which a change in the refractive index due to the application of an electric field has a different sign depending on a mode of a propagation light. As a specific example, lithium tantalum oxide (LiTaO$_3$: LT), β-BaB$_2$O$_4$ (BBO), LiIO$_3$ and the like can be used besides the lithium niobate.

In the formation of the optical waveguide 11, a Ti film is deposited on the substrate surface, and is patterned to have the width of about 100 nm. Then, the patterned Ti film is heated at 1000° C. for about 12 to 40 hours such that Ti is thermally diffused. Thereby, the optical waveguide 11 having the width of about 5 μm is formed on the surface of the substrate 10 to cross the substrate 10.

A film is formed on the surface of the substrate 10 on which the optical waveguide 11 is formed, to have the thickness of 10 nm or more. The film is formed of metal(s) such as Au, Ti, Cr and Ni or a combination of them, and semiconductor(s) such as ITO and silicon. The phase modulation electrodes 12a and 12b of the phase modulator section 12 and the adjusting electrodes 13a and 13b of the adjustment section 13 are formed by patterning the film.

The phase modulation electrodes 12a and 12b are sequentially arranged in the Z-axis direction to cover the optical waveguide 11. Thus, it is possible to generate electric field in the Z-axis direction using the phase modulation electrodes 12a and 12b. Also, the adjusting electrodes 13a and 13b are arranged on both sides of the optical waveguide 11 to put the optical waveguide 11 between them. Thus, it is possible to generate electric field in a Y-axis direction using the adjusting electrodes 13a and 13b.

An input optical fiber 20 is connected to an input end of the optical waveguide 11, and an output optical fiber 21 is connected to an output end of the optical waveguide 11.

In the optical control device having the above-mentioned structure, light is inputted from the input optical fiber 20 to the optical waveguide 11, is propagated through the optical waveguide 11 and outputted to the output optical fiber 21. The refractive index of the optical waveguide 11 formed of lithium niobate is varied by the application of the electric field in the phase modulator section 12 and the adjustment section 13. Thus, a phase of the light propagated through the optical waveguide 11 is varied. In this way, phase modulation is carried out by the phase modulator section 12. The adjustment section 13 eliminates the polarization dependency.

Figure 4:
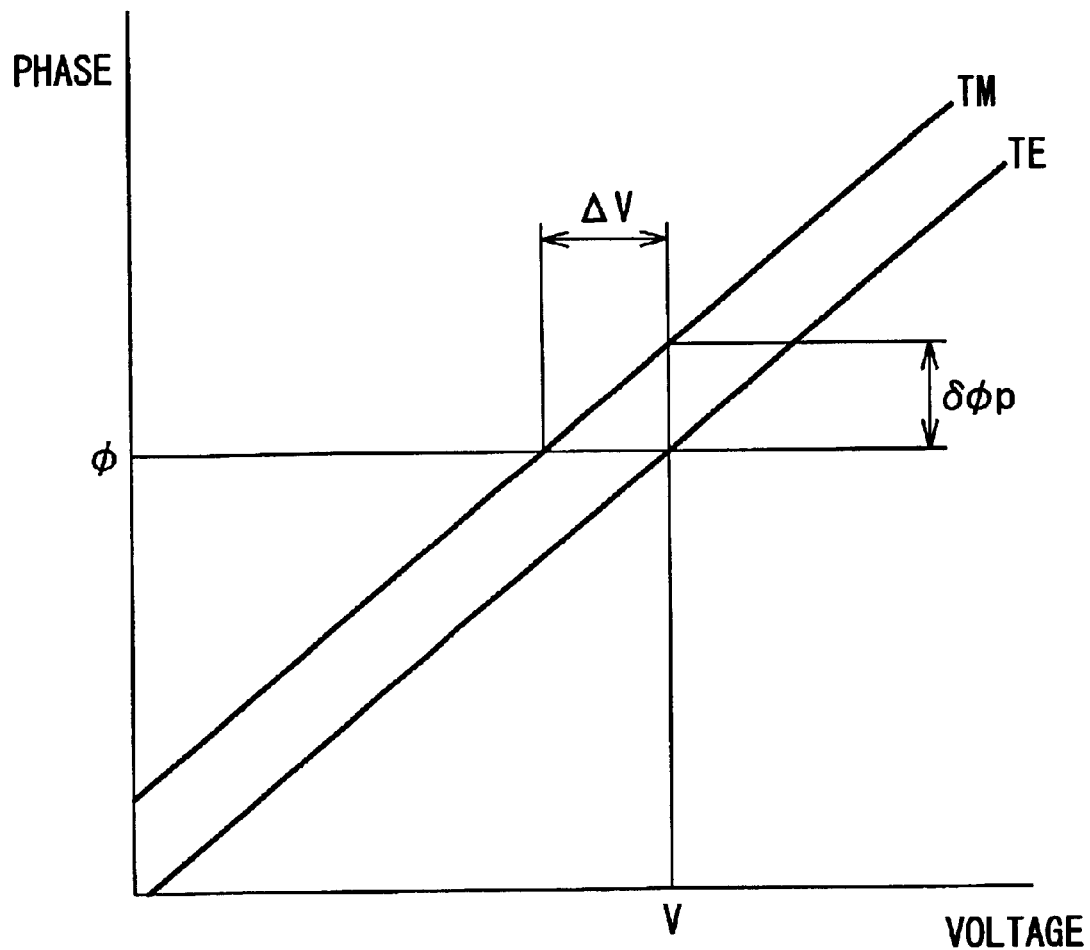
FIG. 4 is a diagram showing the prevention of polarization dependency in the optical phase modulator according to the first embodiment of the present invention.

The phase modulator changes the length of an optical path in the optical waveguide in accordance with the change in a refractive index of the waveguide, and modulates the phase of the propagated light. If an electric field is applied to the optical waveguide 11 to change the polarization state of the light from the input optical fiber 20, the phase of a light outputted to the output optical fiber 21 is changed. Thus, the phase modulation is achieved by changing the refractive index of the optical waveguide through the application of the electric field. FIG. 4 shows a relation between the phase of the light propagated through the optical waveguide 11 and a drive voltage applied between the phase modulator electrodes 12. As shown in FIG. 4, when a voltage V is applied between the phase modulation electrodes 12a and 12b, the phase shift amounts of the TM mode wave and TE mode wave are different. The difference in the phase change amount is represented as $\delta_\phi$. The polarization dependency of the phase modulated light is induced due to the difference in the phase change amount. The phase difference $\delta_{\phi p}$ corresponds to the voltage difference $\Delta V$ in the drive voltage. In this example, by applying the voltage difference $\Delta V$ in a negative direction, the phase difference could be eliminated.

Actually, the optical waveguide 11 has a distribution of the refractive index and the refractive index changes due to the applied electric field and a distribution of the stresses in the optical waveguide 11. For this reason, in the optical phase modulator of the present invention, a control voltage is applied between the adjusting electrodes 13a and 13b to set the voltage difference $\Delta V$ to zero. Thus, the polarization dependency can be eliminated.

In the lithium niobate of the X-cut Z-axis propagation, it is supposed that an electric field By parallel to the Y-axis direction is applied. Here, when $n_x$ and $n_y$ are refractive indexes of the optical waveguide 11 in the X- and Y-axis directions, and $r_{22}$ is an electro-optical constant, the refractive index $n_x$ (TM mode) in the X-axis direction of FIG. 3 is given by the following equation (1):

$$n_x = n_o - \frac{1}{2}n_o^3 r_{22} E_y \quad (1)$$

Also, the refractive index $n_y$ (TE mode) in the Y-axis direction is given by the following equation (2):

$$n_y = n_o + \frac{1}{2}n_o^3 r_{22} E_y \quad (2)$$

Thus, the refractive index change in the TM mode wave when the electric field is applied in the Y-axis direction is different in sign from the refractive index change in the TE mode wave when the electric field is applied in the Y-axis direction. Also, the refractive index change when the electric field is applied in the Y-axis direction is different in sign from the refractive index change when the electric field is applied in the Z-axis direction. From the equations (1) and (2), the refractive index can be increased or decreased for each mode to thereby control the polarization dependency. For further information of derivation of the above equations, see Chapter 5, "Control of Waveguide Light" of "Optical Integrated Circuit" (written by Hiroshi Nishihara, Masamitsu Haruna and Toshlaki Seihara and issued by Ohmsha).

In the optical phase modulator in the first embodiment, the control voltage is applied between the adjusting electrodes 13a and 13b to eliminate the polarization dependency by using the effect that the application of the electric field causes the change in the refractive index of the optical waveguide 11 as mentioned above. Thus, the polarization dependency can be eliminated.

The control voltage applied between the adjusting electrodes 13a and 13b is different depending on the structure of the adjusting electrodes and the optical waveguide. FIG. 5 shows a refractive index change in the TM mode and a refractive index change in the TE mode with regard to a cut orientation of the substrate 10, a propagation direction of the waveguide light and the control voltages applied to the adjusting electrodes 13a and 13b. As can be understood from FIG. 5, if an electric field is applied in the Y-axis direction of the substrate 10 in the X-cut Z-axis propagation, the refractive index change has the different sign depending on the mode of the propagation light. Thus, if the control voltage $\Delta V/2$ is applied between the adjusting electrodes 13a and 13b to generate the adjusting electric field EY, the refractive index for the TM mode wave is decreased by a predetermined value. Also, the refractive index for the TE mode wave is increased by the predetermined value. Thus, the phase difference $\delta_{\phi p}$ can be eliminated.

Figure 6:
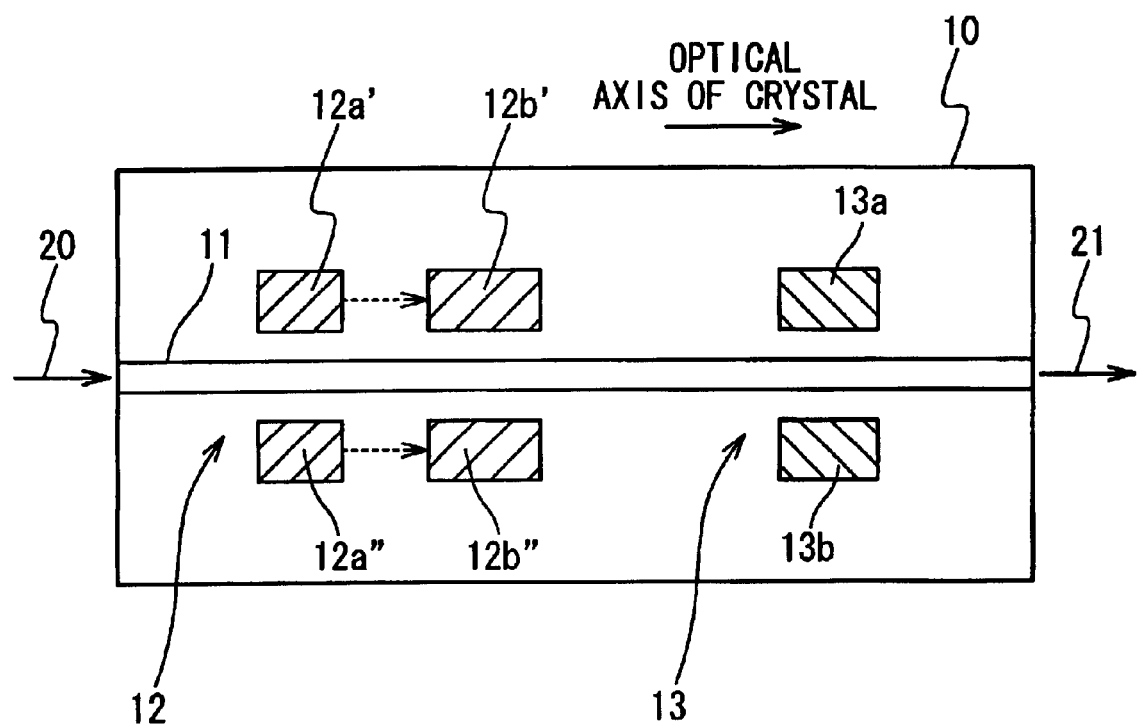
FIG. 6 is a plan view showing the optical phase modulator according to a modification of the first embodiment of the present invention.

Next, a modification of the first embodiment of the present invention will be described below. In the modification, lithium niobate with a Y-cut Z-axis propagation is used as the substrate 10. Even in the case, the phase modulator section 12 and the adjustment section 13 are formed in the same way as mentioned above. It should be noted that in the first embodiment, the phase modulation electrodes 12a and 12b of the phase modulator section 12 are sequentially arranged in the Z-axis direction so as to cover the optical waveguide 11. However, as shown in the phase modulator section 12 of FIG. 6, the phase modulation electrode 12a may be divided into a phase modulation electrode 12a' and a phase modulation electrode 12a", and the phase modulation electrode 12b may be divided into a phase modulation electrode 12b' and a phase modulation electrode 12b". In this case, the phase modulation electrode 12a' and the phase modulation electrode 12a" are provided on opposite sides of the optical waveguide 11. Similarly, the phase modulation electrode 12b' and the phase modulation electrode 12b" are provided on an opposite sides of the optical waveguide 11. A voltage is applied between the phase modulation electrode 12a' and the phase modulation electrode 12b', and another voltage is applied between the phase modulation electrode 12a" and the phase modulation electrode 12b". Thus, an electric field is generated in a direction from the phase modulation electrode 12a' to the phase modulation electrode 12b', and also another electric field is generated from the phase modulation electrode 12a" to the phase modulation electrode 12b". These electric fields are parallel to the Z-axis direction.

According to the modification, as shown in FIG. 5, if an electric field is applied in the Y-axis direction in the Y-cut Z-axis propagation, the refractive index change has the different sign depending on the mode of the propagation light. Thus, in this case, the refractive index for the TM mode wave is increased by a predetermined value and the refractive index for the TE mode wave is decreased by the predetermined value, if the voltage $\Delta V/2$ is applied between the adjusting electrodes 13a and 13b to generate the adjusting electric field EY. Thus, $\delta_{\phi p}$ can be cancelled so that the polarization dependency can be eliminated.

It should be noted that in the first embodiment and the modification thereof, the adjusting electrodes 13a and 13b of the adjustment section 13 are arranged, and the electric field is generated by applying the voltage between them. Thus, the refractive index of the optical waveguide is changed on the basis of the electric field. However, as the adjustment section 13, it is possible to use the structure in which heat, magnetic field, and stress are applied to periodically change the refractive index.

In an optical equalizer according to the present invention, the above-mentioned phase modulator according to the first embodiment is formed to have an array structure.

FIG. 7 is a plan view showing the structure of the optical equalizer according to the present invention. FIG. 9 is a block diagram showing a function of the equalizer. The equalizer is composed of a circulator 30, an optical splitting and combining unit 31, a phase modulator array 32 and a mirror 33.

The circulator 30 is a device for switching between an input light and an output light. The input light from an external portion is propagated to the optical splitting and combining unit 31. Also, the light from the optical splitting and combining unit 31 is propagated as the output light to an external portion. It should be noted that in the equalizer, a directional coupler may be used instead of the circulator 30.

The optical splitting and combining unit 31 separates a multiple wavelength light from the circulator 30 into single wavelength lights. As the optical splitting and combining unit 31, it is possible to use an array waveguide grating (AWG). FIG. 8 shows the array waveguide grating in detail. The multiple wavelength light inputted from the circulator 30, namely, the light on which a plurality of wavelengths $\lambda_1$, $\lambda_2$, ... $\lambda_N$ are superimposed is propagated through an input slab, array waveguides and an output slab, and separated into the plurality of single wavelength lights with the wavelengths of $\lambda_1$, $\lambda_2$, ... $\lambda_N$. The separated single wavelength lights are propagated to the phase modulator array 32.

The phase modulator array 32 is structured by integrating a plurality of optical phase modulators, described in the first embodiment into an array. The plurality of single wavelength lights are inputted from the optical splitting and combining unit 31 to the input ends of the optical waveguides of the plurality of phase modulators, respectively. Then, each phase modulator carries out the phase modulation to the input light while preventing the polarization dependency. Then, the lights are outputted from the output end.

The mirror 33 is provided at the output end of the phase modulator array 32. The lights from the phase modulator array 32 are reflected by the mirror 33, and propagated through the above-mentioned route to the circulator 30. Then, the reflected light is propagated as the output light from the circulator 30 to the external portion.

According to the equalizer having the above-mentioned structure, it is possible to carry out the phase modulation while eliminating the polarization dependency.

As mentioned above in detail, according to the present invention, it is possible to provide the optical phase modulator and the equalizer using the same. The phase modulator has the simple structure and can prevent the polarization dependency.

What is claimed is:

1. An optical phase modulator comprising:
    a substrate having an electro-optical effect;
    an optical waveguide formed in a surface portion of said substrate and having an input end and an output end;
    a phase modulation section provided on said optical waveguide to carry out phase modulation of input light; and
    an adjustment section provided on said optical waveguide to eliminate polarization dependency of the phase-modulated light, wherein:
        said phase modulation section carries out the phase modulation of the light by changing a refractive index of said optical waveguide in response to a first voltage;
        said adjustment section carries out the elimination of the polarization dependency of the phase-modulated light be changing a refractive index of said optical waveguide in response to a second voltage; and
        a refractive index change rate in said phase modulation section and a refractive index change rate in said adjustment section have different signs from each other.

2. The optical phase modulator according to claim 1, wherein said phase modulation section comprises:
    a first phase modulation electrode adjacent the input end of said optical waveguide; and
    a second phase modulation electrode adjacent said first phase modulation electrode, on the side thereof toward the output end of said optical waveguide, and
    the phase modulation is carried out on the light by a first electric field which is generated by applying the first voltage between said first and second phase modulation electrodes.

3. The optical phase modulator according to claim 1, wherein said adjustment section comprises adjustment electrodes provided on either side of said optical waveguide along said optical waveguide, and
    the polarization dependency is eliminated by a second electric field which is generated by applying the second voltage between said adjustment electrodes.

4. The optical phase modulator according to claim 1, wherein said substrate comprises lithium niobate ($LiNbO_3$) and cut out to have a plane orthogonal to an X-axis, and
    said optical waveguide is formed in the surface portion of said substrate having a plane orthogonal to the X-axis and extending in a Z-axis direction.

5. An optical phase modulator comprising:
    a substrate having an electro-optical effect;
    an optical waveguide formed in a surface portion of said substrate;
    a phase modulation section provided on said substrate, along said optical waveguide, to carry out phase modulation of input light; and
    an adjustment section provided on said substrate, to eliminate polarization dependency of the phase-modulated light, wherein:
        said phase modulation section includes:
            a first set of phase modulation electrodes provided on said substrate along said optical waveguide on one side of said optical waveguide; and
            a second set of phase modulation electrodes provided on said substrate along said optical waveguide on the other side of said optical waveguide; and
        said phase modulation section carries out the phase modulation to the light by a first electric field which is generated by applying a first voltage between said phase modulation electrodes of said first set and second electric field which is generated by applying a second voltage between said phase modulation electrodes of said second set.

6. The optical phase modulator according to claim 5, wherein said adjustment section comprises adjustment electrodes provided on either side of said optical waveguide along said optical waveguide, and
    the polarization dependency is eliminated by a third electric field which is generated by applying a third voltage between said adjustment electrodes.

7. The optical phase modulator according to claim 5, wherein said phase modulation section carries out the phase modulation of the light by changing a refractive index of said optical waveguide in response to the first and second voltages, and
    said adjustment section carries out the elimination of the polarization dependency of the phase-modulated light by changing a refractive index of said optical waveguide in response to a third voltage.

8. The optical phase modulator according to claim 7, wherein a refractive index change rate in said phase modulation section and a refractive index change rate in said adjustment section have different signs from each other.

9. The optical phase modulator according to claim 5, wherein said substrate comprises lithium niobate (LiNbO$_3$) and cut out to have a plane orthogonal to an X-axis,
said optical waveguide is formed in the surface portion of said substrate having a plane orthogonal to the X-axis and extending in a Z-axis direction.

10. An optical phase modulator comprising:
a substrate having an electro-optical effect;
an optical waveguide formed in a surface portion of said substrate and having an input end and an output end;
a phase modulation section for changing a refractive index of said optical waveguide for phase modulation of input light; and
an adjustment section for changing a refractive index of said optical waveguide for elimination of polarization dependency of the phase-modulated light,
wherein the refractive index change rate in said phase modulation section and the refractive index change rate in said adjustment section have different signs from each other.

11. The optical phase modulator according to claim 10, wherein said substrate comprises a one-axis crystal material having a trigonal crystal system and having an electrooptical effect.

12. The optical phase modulator according to claim 10, wherein said substrate comprises a one-axis crystal material having a hexagonal crystal system and having an electrooptical effect.

13. The optical phase modulator according to claim 10, wherein said substrate comprises a material in which a point group of a crystal is $C_{3v}$, $C_3$, $D_3$, $C_{3h}$, and $D_{3h}$.

14. The optical phase modulator according to claim 10, wherein said substrate comprises lithium tantalum oxide.

15. The optical phase modulator according to claim 10, wherein said substrate comprises $\beta$-BaB$_2$O$_4$.

16. The optical phase modulator according to claim 10, wherein said substrate comprises LiIO$_3$.

17. An optical phase modulator comprising:
a substrate having an electro-optical effect; and
a plurality of phase modulation units formed on said substrate,
wherein each phase modulation unit includes:
an optical waveguide formed in a surface portion of said substrate;
a phase modulation section for changing a refractive index of said optical waveguide for phase modulation of input light; and
an adjustment section for changing a refractive index of said optical waveguide for elimination of polarization dependency of the phase-modulated light,
wherein at least one of said phase modulation sections includes:
a first set of phase modulation electrodes provided on said substrate alone said optical waveguide on one side of said optical waveguide; and
a second set of phase modulation electrodes provided on said substrate along said optical waveguide on the other side of said optical waveguide, and
wherein said at least one phase modulation section carries out the phase modulation of the light by a first electric field which is generated by applying a first voltage between said phase modulation electrodes of said first set and a second electric field which is generated by applying a second voltage between said phase modulation electrodes of said second set.

18. The optical phase modulator according to claim 17, wherein within each phase modulation unit the refractive index change rate in said phase modulation section and the refractive index change rate in said adjustment section have different signs from each other.

19. An optical equalizer comprising:
a circulator for receiving multiple wavelength light and outputting phase-modulated multiple wavelength light;
an optical splitting and combining unit for separating the multiple wavelength light supplied from said circulator into a plurality of single wavelength lights, and combining a plurality of single wavelength reflected lights into the phase-modulated multiple wavelength light for outputting to said circulator; and
a phase modulator for phase modulating the plurality of single wavelength lights without polarization dependency, to produce a plurality of single wavelength phase-modulated lights, and reflecting the plurality of single wavelength phase-modulated lights to said optical splitting and combining unit as the plurality of single wavelength reflected lights.

20. The equalizer according to claim 19, wherein said phase modulator comprises:
a substrate having an electro-optical effect; and
a plurality of phase modulation units formed on said substrate for carrying out the phase modulation of the plurality of single wavelength lights without polarization dependency and passing the plurality of single wavelength phase-modulated lights; and
a mirror for reflecting the plurality of single wavelength phase-modulated lights such that the plurality of single wavelength phase-modulated lights pass through said plurality of phase modulation units and are supplied to said optical splitting and combining unit as the plurality of single wavelength reflected lights.

21. The equalizer according to claim 20, wherein each of said plurality of phase modulation units comprises:
an optical waveguide formed in a surface portion of said substrate and having an input end and an output end;
a phase modulation section adjacent the input end of said optical waveguide, to change a refractive index of said optical waveguide for phase modulation to input light; and
an adjustment section adjacent the output end of said optical waveguide, to change a refractive index of said optical waveguide for elimination of polarization dependency of the phase-modulated light.

22. The equalizer according to claim 21, wherein within each of said phase modulation units the refractive index change rate in said phase modulation section and the refractive index change rate in said adjustment section have different signs from each other.

23. The equalizer according to claim 21, wherein within each of said phase modulation units said phase modulation section comprises:
a first phase modulation electrode adjacent the input end of said optical waveguide; and
a second phase modulation electrode adjacent the output end of said optical waveguide, and
the phase modulation is carried out on the light by a first electric field which is generated by applying a first voltage between said first and second phase modulation electrodes.

24. The equalizer according to claim 21, wherein within each of said phase modulation units said phase modulation section comprises:
- a first set of phase modulation electrodes provided on said substrate along said optical waveguide on one side of said optical waveguide; and
- a second set of phase modulation electrodes provided on said substrate along said optical waveguide on the other side of said optical waveguide, and
- said phase modulation section carries out the phase modulation of the light by a first electric field which is generated by applying a first voltage between said phase modulation electrodes of said first set and a second electric field which is generated by applying a second voltage between said phase modulation electrodes of said second set.

25. The equalizer according to claim 21, wherein within each of said phase modulation units said adjustment section comprises adjustment electrodes provided on either side of said optical waveguide along said optical waveguide, and
- the polarization dependency is eliminated by a third electric field which is generated by applying a third voltage between said adjustment electrodes.

26. An optical phase modulator comprising:
- a substrate having an electro-optical effect;
- an optical waveguide formed in a surface portion of said substrate;
- a phase modulation section provided on said substrate, along said optical waveguide to carry out phase modulation of input light; and
- an adjustment section provided on said substrate, to eliminate polarization dependency of the phase-modulated light, wherein:
  - said phase modulation section carries out the phase modulation of the light by changing a refractive index of said optical waveguide in response to first and second voltages, and
  - said adjustment section carries out the elimination of the polarization dependency of the phase-modulated light by changing a refractive index of said optical waveguide in response to a third voltage.

27. The optical phase modulator according to claim 26, wherein a refractive index change rate in said phase modulation section and a refractive index change rate in said adjustment section have different signs from each other.

28. An optical phase modulator comprising:
- a substrate having an electro-optical effect;
- an optical waveguide formed in a surface portion of said substrate and having an input end and an output end;
- a phase modulation section provided on said optical waveguide to carry out phase modulation of input light; and
- an adjustment section provided on said optical waveguide to eliminate polarization dependency of the phase-modulated light,
- wherein a refractive index change rate in said phase modulation section and a refractive index change rate in said adjustment section have different signs from each other.

* * * * *